(12) United States Patent
Shiyafetdinov et al.

(10) Patent No.: US 8,938,778 B2
(45) Date of Patent: Jan. 20, 2015

(54) SYSTEM AND METHOD FOR CONTROLLING USER ACCESS TO ENCRYPTED DATA

(71) Applicant: Kaspersky Lab ZAO, Moscow (RU)

(72) Inventors: Damir R. Shiyafetdinov, Moscow (RU);
Alexander N. Makarov, Moscow (RU);
Evgeniya P. Kirikova, Moscow (RU);
Vladislav I. Ovcharik, Moscow (RU);
Konstantin V. Kamanin, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 14/077,360

(22) Filed: Nov. 12, 2013

(65) Prior Publication Data

US 2014/0325226 A1  Oct. 30, 2014

Related U.S. Application Data

(63) Continuation of application No. 13/939,570, filed on Jul. 11, 2013.

(30) Foreign Application Priority Data

Apr. 26, 2013  (RU) ................ 2013119284

(51) Int. Cl.
*G06F 21/00* (2013.01)
*H04L 9/08* (2006.01)
*G06F 21/62* (2013.01)
*G06F 21/31* (2013.01)
*G06F 21/78* (2013.01)

(52) U.S. Cl.
CPC .............. *H04L 9/0819* (2013.01); *G06F 21/62* (2013.01); *G06F 21/31* (2013.01); *G06F 21/78* (2013.01)

USPC ................................................ 726/1; 713/193

(58) Field of Classification Search
CPC .......... G06F 21/31; G06F 21/62; G06F 21/78
USPC ....................................... 726/1; 713/193, 183
See application file for complete search history.

(56) References Cited

U.S. PATENT DOCUMENTS

2005/0111664 A1\* 5/2005 Ritz et al. ...................... 380/255
2006/0242685 A1  10/2006 Heard et al.
2007/0022285 A1\* 1/2007 Groth et al. .................... 713/155

(Continued)

FOREIGN PATENT DOCUMENTS

WO  2011083343 A2  7/2011

*Primary Examiner* — Michael Pyzocha
(74) *Attorney, Agent, or Firm* — Arent Fox LLP; Michael Fainberg (57) ABSTRACT

Disclosed are systems, methods and computer program products for providing user access to encrypted data. In one example, a system is configured to receive a security policy for the user device, wherein the security policy includes data access conditions and data encryption conditions for one or more users of the user device; identify one or more user accounts in the OS of the user device as specified in the data access conditions; create a pre-boot authentication account (PBA) for the identified user accounts based on the data access conditions, for storing pre-boot authentication credentials for authenticating a user before booting of the OS on the user device; and encrypt at least a portion of data stored on the user device based on the data encryption conditions, wherein access to the encrypted portion of data is granted to the user upon entry of the correct pre-boot authentication credentials.

23 Claims, 6 Drawing Sheets

(56) References Cited

U.S. PATENT DOCUMENTS

| | | | |
|---|---|---|---|
| 2007/0067465 A1* | 3/2007 | Blinn et al. | 709/229 |
| 2007/0100929 A1* | 5/2007 | DeRobertis et al. | 709/200 |
| 2008/0077986 A1* | 3/2008 | Rivera et al. | 726/20 |
| 2008/0083019 A1* | 4/2008 | Wang et al. | 726/5 |
| 2010/0241668 A1 | 9/2010 | Susanto et al. | |
| 2010/0303240 A1* | 12/2010 | Beachem et al. | 380/277 |
| 2012/0151200 A1* | 6/2012 | Beachem et al. | 713/2 |
| 2012/0151223 A1 | 6/2012 | Conde Marques et al. | |
| 2012/0179915 A1* | 7/2012 | Horn et al. | 713/189 |
| 2012/0254602 A1* | 10/2012 | Bhansali et al. | 713/2 |
| 2013/0019276 A1 | 1/2013 | Biazetti et al. | |

\* cited by examiner

SYSTEM AND METHOD FOR CONTROLLING USER ACCESS TO ENCRYPTED DATA

CROSS-REFERENCE TO RELATED APPLICATIONS

This application is continuation of U.S. patent application Ser. No. 13/939,570 filed Jul. 11, 2013, which claims benefit of priority under 35 U.S.C. 119(a)-(d) to a Russian Application No. 2013119284 filed on Apr. 26, 2013, both of which are incorporated by reference herein.

TECHNICAL FIELD

The disclosure relates generally to the field of information security, and more specifically to systems and methods for controlling user access to encrypted data.

BACKGROUND

In modern corporate networks, the requirements for information security of corporate work stations and other end-user devices, such as laptops, smart phones and removable storage media, are constantly increasing as cases of information theft and data leakage from corporate networks, which cause significant financial losses, become more common. Because of the vulnerabilities in the corporate software and various human mistakes, seemingly safe data stored on the end-user devices connected to the corporate network can be accessed by malware and hackers. Therefore, the encryption of data and files on corporate end-user devices becoming increasingly important to the security of corporate networks.

A corporate security system typically includes security software deployed on protected end-user devices and an administration server, which enables the system administrator to configure security software, apply security policies (e.g., data encryption policies), and perform other security tasks. However, when a large number of users are working on different devices or on the same device, but under multiple user credentials (e.g., login names and passwords), the administrator must, for each set of user credentials, configure the security system and apply appropriate security policies. This complicates the work of the system administrator and creates inconvenience to the end users. Therefore, there is a need to improve implementation of various security tasks, and particularly data encryption policies.

SUMMARY

Disclosed are systems, methods and computer program products for providing user access to encrypted data on a user device. In one example aspect of the method, a system receives a security policy for the user device from a security server. The security policy includes data access conditions and data encryption conditions for one or more users of the user device. The system identifies one or more user accounts in the operating system (OS) of the user device for users specified in the data access conditions contained in the received security policy. The system then creates at least one pre-boot authentication account (PBA) for the identified user accounts based on the data access conditions, wherein a PBA account stores pre-boot authentication credentials for authenticating one or more users before booting of the OS on the user device. Finally, the system encrypts at least a portion of data stored on the user device based on the data encryption conditions, wherein access to the encrypted portion of data is granted to the user at least upon entry of the correct pre-boot authentication credentials.

In one example aspect, the system encrypts one or more files or folders containing data of a user associated with each user account, all user data stored on the user device, all OS data stored on the user device, and one or more hard disk drives of the user device.

In another example aspect, the security policy for the user device includes encryption and decryption keys for the user device. In another aspect, the encryption and decryption keys may be stored on the user device in a container encrypted by the public key of a security server. In yet another aspect, the system may sending the encrypted container to the security server for decryption of the container using public key of the security server and receive from the security server encryption and decryption keys decrypted by the server.

In another example aspect, the security policy includes one or more conditions for automatically creating PBA accounts for at least one of: all identified user accounts on the user device, all identified user accounts corresponding to the user accounts from a current domain or domains that have a trust relationship with the current domain, all local users, an integrated local administrator account, an owner of the user device, and a current active user.

In another example aspect, the system identifies one or more user accounts in the OS of the user device by analyzing one or more of: registry branch HKEY_USERS, unloaded registry branches, directory of user accounts, and file "/etc/passwd".

In another example aspect of a method for providing user access to encrypted data on a user device, the system receives a security policy for the user device, wherein the security policy includes data access conditions and data encryption conditions for one or more users of the user device. The system identifies one or more user accounts in the OS of the user device for users specified in the data access conditions contained in the received security policy. The system then encrypts at least a portion of data associated with the identified one or more user accounts based on the data encryption conditions contained in the received security policy. In one example aspect, the system may encrypt one or more files or folders containing data of a user associated with each identified user account.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the present invention comprise the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Example aspects of the present invention are described herein in the context of systems, methods and computer program products for accessing encrypted data. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
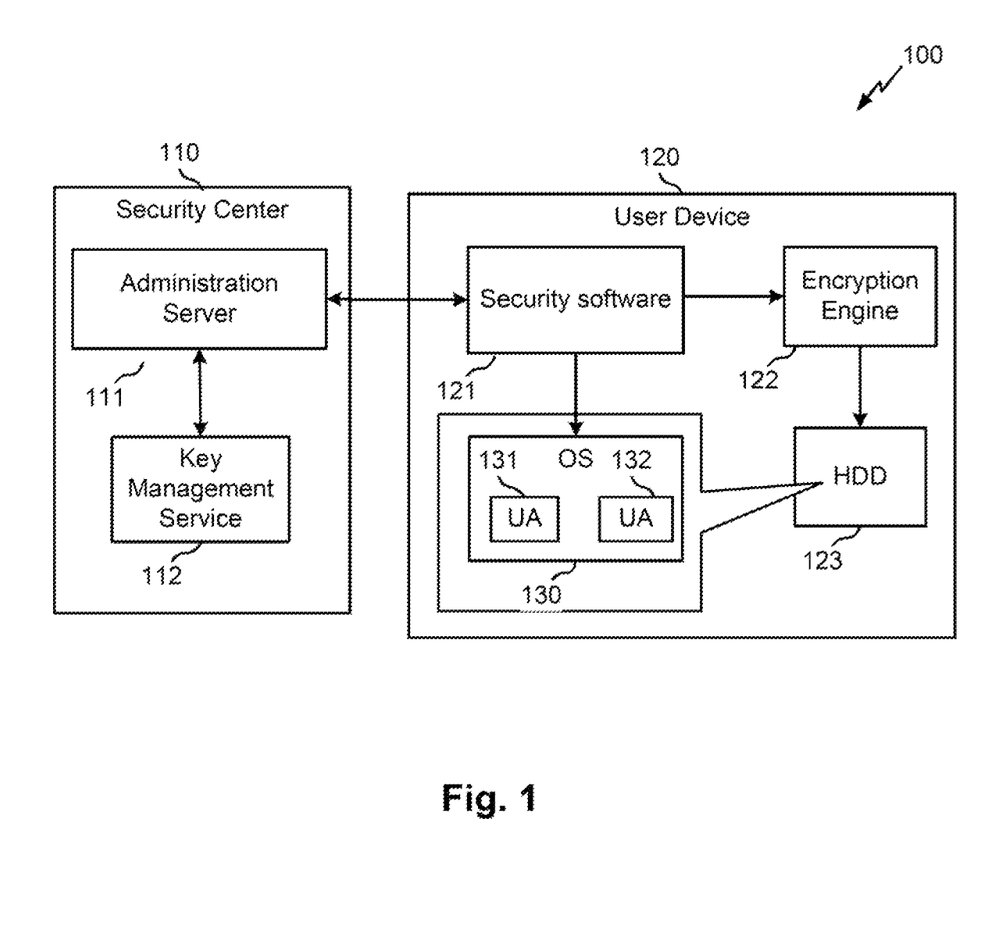
FIG. 1 illustrates a diagram of an example corporate security system in accordance with aspects of the present invention.

FIG. 1 is an example a corporate security system in accordance with aspects of the present invention. The security system 100 includes a security center 110 used for coordinating the protection of corporate end-user devices 120, such as workstations, desktop and laptop computers, smart phones, external storage devices, etc. (interchangeable referred to herein as user devices or computers), as well as configuration and storage of security policies for the end-user devices 120, including data access and encryption policies, in one aspect, the data access and encryption policies for the user devices 120 can be set by the administrator of the security center 110. In one example, the security center 110 includes an administration server 111, which performs centralized storage of information about security software 121 installed on the end-user devices 120 and management of the security software 121. In one example, the security center 110 also includes a key management service 112, which performs the functions of generating, storing and communicating to end-user devices 120 encryption/decryption keys used by the security software 121 for encrypting/decrypting data on the end-user devices 120.

In one example, the end-user device 120 includes security software 121, encryption engine 122 and one or more hard disk drives (HDDs) 123. An HDD 123 may have installed thereon an operating system (OS), such as Windows OS, Unix OS, Mac OS, Android OS, Symbian OS, or other type of OS. In one aspect, the OS 130 may store information about a plurality of user accounts (UA) 131-132, which contain login credentials of registered device user(s), such as their login names, passwords and various access rights information. In one aspect, security software 121 may obtain from the administration server 111 data encryption policies for the users of device 120 and exchange encryption keys between the end-user device 120 and the administration server 111. In one aspect, the encryption engine 122 of the end-user device 120 may perform encryption/decryption of data and files on the HDD 123 using encryption keys obtained by the security software 121 from key management service 112. In various aspects, the security software 121 and the encryption engine 122 can be implemented as one or more applications, as well as firmware or hardware devices, among other implementations.

Figure 2:
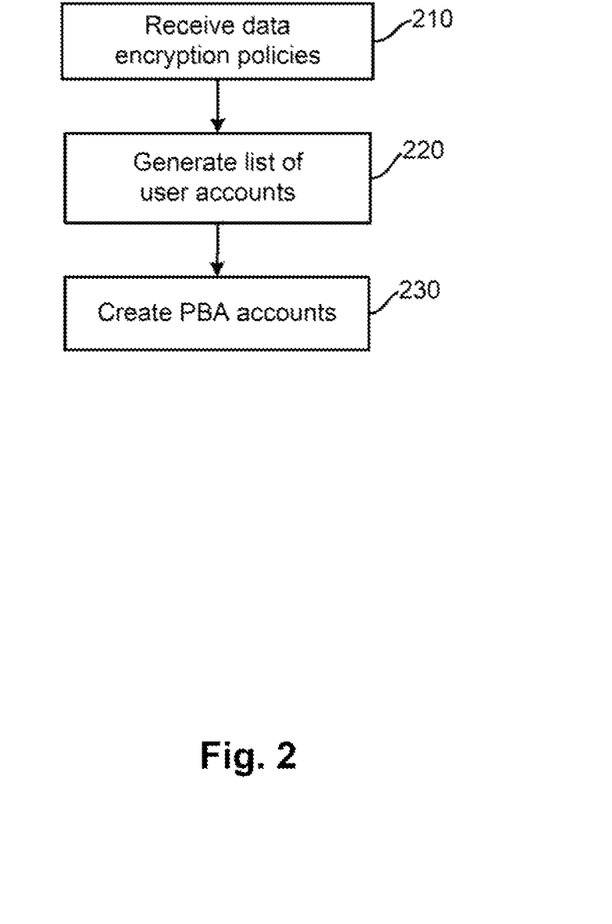
FIG. 2 illustrates a flow diagram of one example methodology for automatically creating pre-boot authentication (PBA) accounts by the corporate security system in accordance with aspects of the present invention.

FIG. 2 illustrates an example methodology for automatically creating pre-boot authentication accounts (PBA), which contain user credentials for accessing one or more encrypted HDDs 123 or sections of an HDD 123 before booting of the OS 130 on the user device 120. At step 210, security software 121 received from the security center 110 a security policy for access to and encryption of one or more HDDs 123 or individual sectors or sections of HDD 123. For example, data encryption policies may include: encrypt/decrypt the boat disk/partition/section and encrypt/decrypt multiple HDDs, among other policies. In one aspect, the security policy may have an option for automatically creating PBA accounts with user credentials for pre-boot authentication of users of devices 120. For example, the HDD 123 may include at least two sections (e.g., partitions): (a) an encrypted section containing the OS 123 and user data, and (b) a non-encrypted section containing encryption engine 122 necessary for the encryption and decryption (after successful pre-boot authentication of the user) of the encrypted sections of the HDD 123. In this case, the security software 121 may be an application installed in the OS 130, for example. At step 220, security software 121 in accordance with the policy criteria for automatically creating PBA accounts, determines a list of user accounts 131-132 in the OS 130 for which it is necessary to create corresponding PBA accounts. Next, at step 230, for one or more detected user account 131-132 in the OS 130, security software 121 creates one or more PBA accounts and stores PBA account parameters in the unencrypted section of HDD 123.

In one aspect, PBA account parameters may include, but are not limited to the name of the user account in the OS 130, the corresponding PBA account name, and PBA password. In one other aspect, the PBA account parameters may further include at least one of the following parameters: a secure identifier (SID), which may be a unique ID (e.g., OS SID), a description, the date and time of creation of the PBA account, the date and time of the change of the PBA account password, access rights (e.g., access permission only to sections of HDD 123 containing system data, or access permission to all sections of the HDD 123), and a flag indicating the need to change the PBA account password at the next login. In one aspect, the PBA account name can be configured automatically, for example, to correspond to the name of the user account in the OS 130. In one aspect, the PBA account password can also be generated automatically and can be provided to the user upon request from the administrator of the security center 110. In another aspect, when during the automatic creation of the PBA accounts on the device 120 a user was working on the device, the security software 121 may prompt the user to enter a PBA account password manually. In this case, the user does not need to ask the administrator for a PBA password. Moreover, if the user has set a PBA account password that is identical to the password for accessing the OS 130, then, in one aspect, the security policy can include an option of a single sign-on: after successful authentication at the pre-boot stage, the password entered by the user may be automatically entered during authentication with the OS, and the user does not need to enter the same password twice. In another aspect, if a single sign-on option is supported, the security software 121 can automatically change the PBA account password to the password for accessing the OS 123, if the latter was changed by the user.

In one aspect, when the device 120 is used by multiple users, the security software 121 may create a unique PBA account for each user of the device 120. In this case, the security software 121 may check whether the user has chosen a unique PBA account name. If the PBA account name is not unique, the security software 121 may generate an error message and complete the task of automatically creating PBA accounts. In another aspect, if the PBA account name is not unique, the security software 121 may prompt the user to choose a different unique name or chose a unique account name automatically. In this case, the user may request a unique PBA account name from the administrator of the security software 121. Finally, if the PBA account name is unique, at step 240, the security software 121 completes the task of automatically creating PBA accounts. In one aspect, during next time the user is authenticated by the security software 121, the user may be asked to change the password that was automatically generated by the system. In one aspect, after the completion of the task of automatically creating PBA accounts, the security software 121 may transmit a list of PBA accounts to the encryption engine 122 and to the security center 110.

In another aspect, a single PBA account (e.g., the same set of login credentials) may be assigned to all users of device 120, in yet another aspect, different groups of users can have different PBA accounts (e.g., one PBA account for all users who have administrator rights on device 120, another PBA account for other users who do not have administrator's rights).

In one aspect, the security software 121 may send information about the created PBA accounts to the security center 110, which allows a user to sign-on to the domain network managed by the security center 110 using other computers and authenticating during pre-boot.

Table 1 below shows example criteria for automatically creating PBA accounts, when security software 121 obtains encryption policy from security center 110, which includes the option to automatically creating PBA accounts. In this case, the administrator of the security center 110 may change/add/delete criteria for automatic creation of PBA accounts.

TABLE 1

| No | Criterion |
|---|---|
| 1 | For all existing accounts on the end-user device |
| 2 | For all existing accounts on the end-user device corresponding to the user accounts from the current domain or domains that have a trust relationship with the current domain |
| 3 | For all local users |
| 4 | To integrated local administrator account |
| 5 | For the owner of the end-user device |
| 6 | For the current active user |
| 7 | For accounts defined in the criteria 1-3, using which a current user was logged on to the device for a predetermined period of time |

In one aspect, if the HDD 123 of the end-user device 120 is running Windows-based OS, for the first criterion in Table 1, the security software 121 can list all users for which OS created registry key HKEY_USERS. In another aspect, the security software 121 may search the system partition of the hard disk drive 120 for a directory of user accounts. In another aspect, if the user device 120 is running UNIX-like OS, the security software 121 may search for user accounts in the file "/etc/passwd." In yet another aspect, if the user device is running Mac OS, the security software 121 can use the utility nireport to search for user accounts.

In one aspect, the security software 121 may generate a list of PBA accounts based on criteria specified in the security policy, in another aspect, for profiles corresponding to the system users, the security software 121 may not create a PBA account (e.g., Windows-based OS system users can include LocalSystem with SID: S-1-5-18, NetworkService, Guest, etc.)

Figure 3:
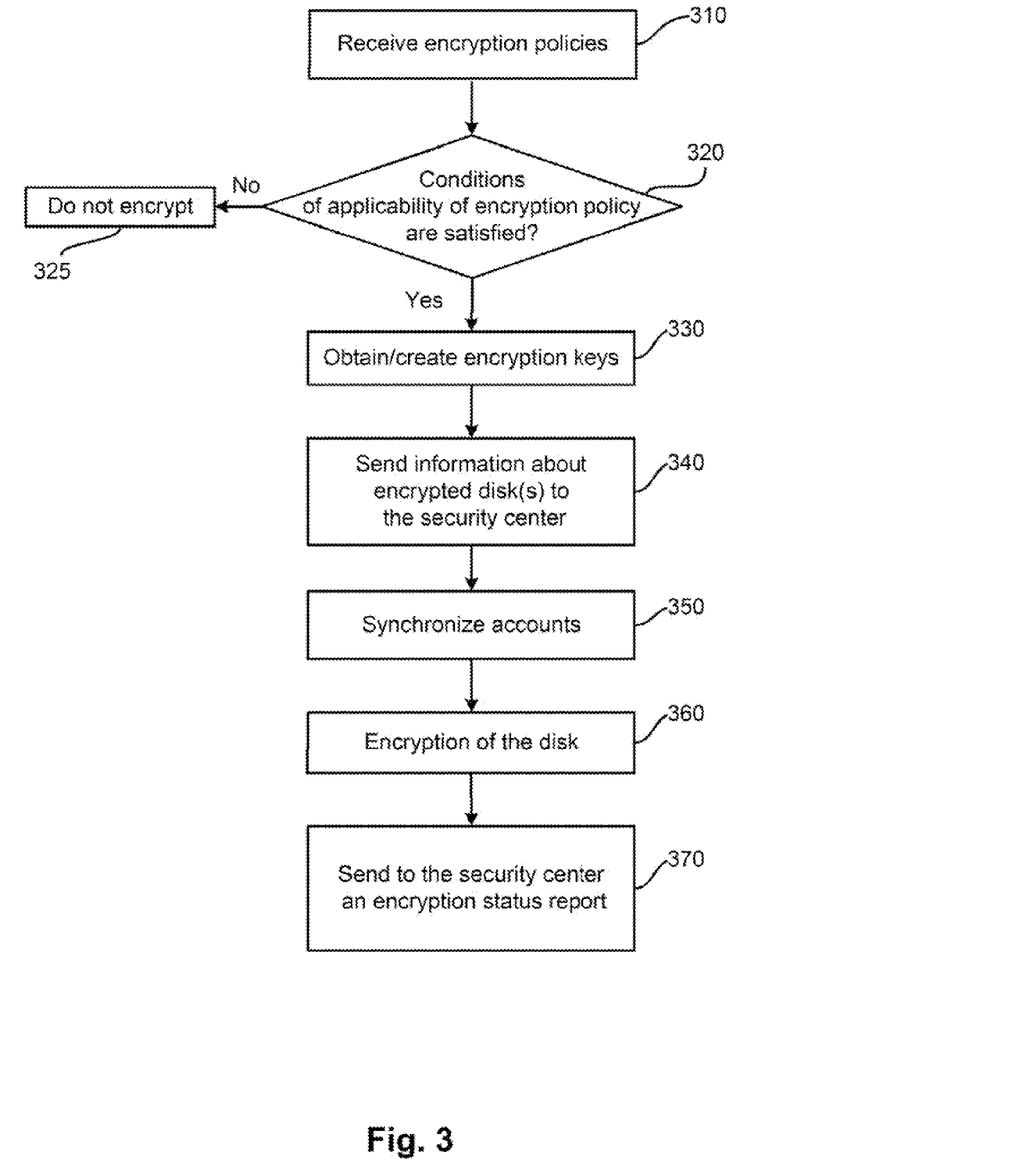
FIG. 3 illustrates a flow diagram of one example methodology for performing encryption of hard drives of user devices by the corporate security system in accordance with aspects of the present invention.

FIG. 3 illustrates one example methodology for performing encryption of hard drives. At step 310, the security software 121 receives encryption policies for HDD(s) 123 of the user device 120 from the security center 110. At step 320, the security software 121 checks whether the conditions of the applicability of the encryption policy are satisfied. For example, a condition of applicability of the encryption policy can be receipt from the security center 110 a task for management of PBA accounts (e.g., add, delete, change the PBA account). In another aspect, such a condition can be presence in the encryption policy of an option to automatically create PBA accounts during the initial encryption of hard drives. If the conditions of the encryption policy are not satisfied, the encryption of the disk may not be performed and encryption task is completed at step 325. If at least one of the conditions is satisfied, in one aspect, at step 330, the security software 121 creates the necessary IDs and keys for encryption of the HDD(s) 123 and, at step 340, the security software 121 sends this information to the security center 110. In another aspect, the encryption key management service 112 may create the necessary IDs and encryption keys and may pass them to the security software 121. At step 350, the security software 121 may perform synchronization/management of the PBA accounts (e.g., add, delete, change the PBA account) and may pass information about the PBA account on the user device 120 for which there are corresponding account in OS to the security center 110. At step 360, the security software 121 may pass all the necessary information for disk encryption (e.g., hard disk IDs, encryption keys, encryption policy) to the encryption engine 122, and encryption engine 122 may encrypt one or more HDDs 123 or parts of the HDD 123 (e.g., boot and system data) according to the received encryption policy. Finally, at step 370, the security software 121 may send status reports about completion of disk encryption (e.g., completed, completed with errors, not completed) to the security center 110. In one aspect, the step 330 may be preceded by another step in which the security software 121 can assess the status of applicability of encryption of HDD(s) 123.

Figure 4:
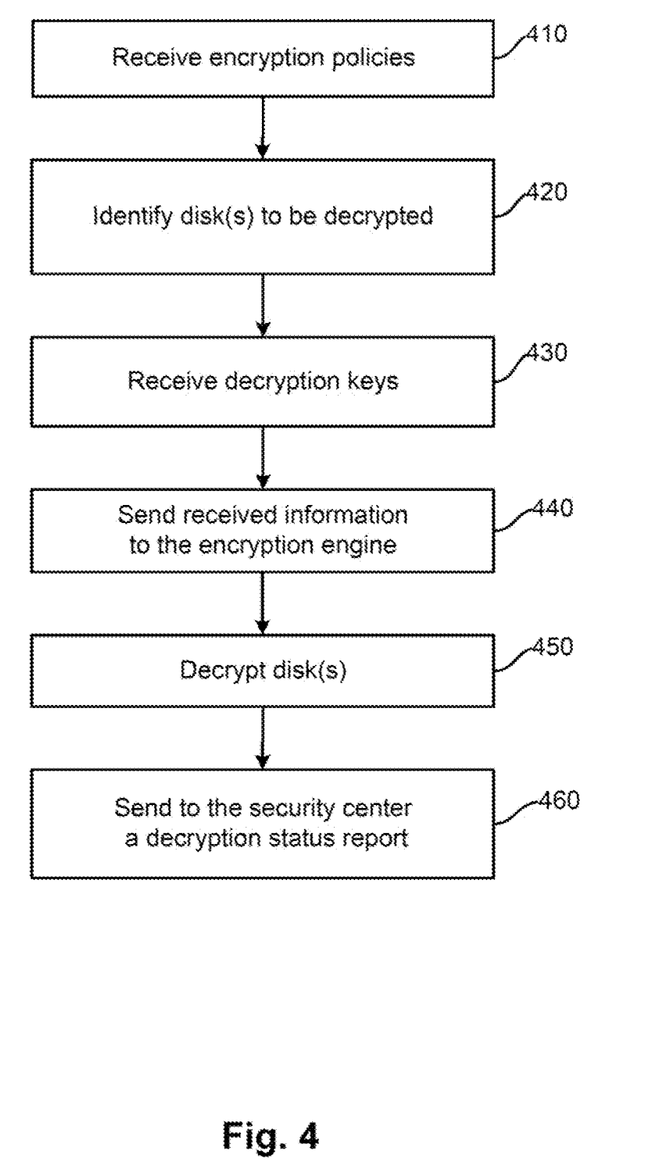
FIG. 4 illustrates a flow diagram of one example methodology for performing decryption of hard drives of user devices by the corporate security system in accordance with aspects of the present invention.

FIG. 4 illustrates one example methodology for performing decryption of hard drives. At step 410, the security software 121 receives hard drive encryption policy that contain commands to decrypt one or more HDDs 123 on the user device 120 (e.g., decrypt only boot drive, all drives, etc.). At step 420, the security software 121 defines a list of drives to decrypt. At step 430, the security software 122 receives the necessary decryption keys from the security center 110. In one aspect, the decryption keys can be stored in an encrypted container on the hard disk 123 of user device 120. The container may be encrypted with the public key of the security center 110. In another aspect, the user device 120 may additionally store hash sums of the decryption keys. In this case, the security software 121 may send the encrypted container to the administration server 111, which in turn may decrypt the received container using a private key of the security center 110 and may send the decrypted decryption keys to security software 121. In various aspects, the encrypted container may be created by the security software 121 or the security center 110 using public key of the security center 110. At step 440, the security software 121 may pass the necessary decryption information (e.g., hard disk ID, decryption keys, etc.) to the encryption engine 122, which, at step 450, may decrypt encrypted HDD(s) 123. At step 460, the security software 121 may send decryption status reports with information about completion of hard drive decryption to the security center 110. In one aspect, the security software 121 may perform all functions of the encryption engine 122.

Figure 5:
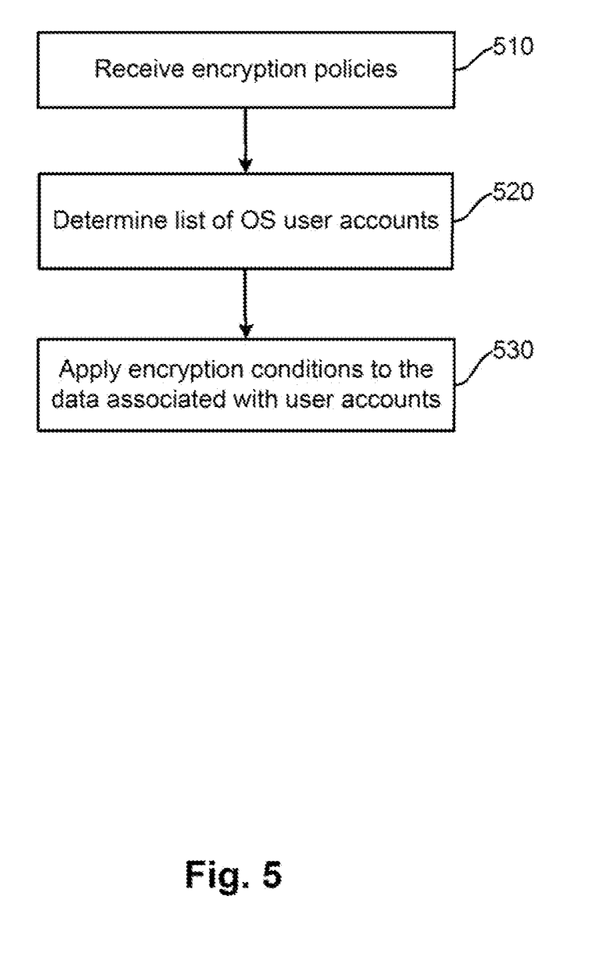
FIG. 5 illustrates a flow diagram of one example methodology for providing user access to encrypted files and folders on the user device in accordance with aspects of the present invention.

FIG. 5 illustrates one example methodology for providing user access to encrypted files and folders. In this aspect, the security software 121 and encryption engine 122 may be applications installed in the operating system 130. At step 510, the security software 121 receives from the security center 110 an encryption policy for encryption of data (e.g., files and folders) of different users of the user device 120. At step 520, the security software 121 on the device 120 determines OS user accounts 131-132 for the users specified in the received encryption policy. For example, if the HDD 123 of device 120 is running a Windows-based OS, the security software 121 may analyze the registry branch HKEY_USERS that contains a list of all loaded OS profiles of the users of device 120 (i.e., OS user accounts). In another aspect, the security software 121 may also analyze still unloaded registry branches (e.g. by analyzing the ntuser.dat file in the OS directory with user profiles). At step 530, the security software 121 may apply encryption conditions specified in the encryption policies to the specified OS user accounts (e.g., to all user accounts, to user accounts that have administrator rights, to a specific group of user accounts, etc.). In one aspect, the encryption conditions can be of two types: (a) encrypt specific set of data (e.g., files/folders), and (b) do not encrypt other specific set of data (e.g., files/folders). The files/folders can be specified by the administrator of the security center 110 or generated automatically according to pre-defined criteria, for example. Furthermore, different sets of files/folders to be encrypted can be defined for different groups of user accounts. For example, to encrypt the contents of the folder "My Documents" for all users, and further encrypt for the owner of the computer all of the following file extensions: "xls," "doc," "docx." In one aspect, the administrator of the security center 110 may define in the encryption policy of users who are allowed to share encrypted data (e.g., employees of certain departments of the company; only managers of certain departments, etc.). Thus, for example, a user cannot access data encrypted by users of another group. In this case, if the user trying to access the encrypted file/folder, the security software 120 can check whether the user has access rights to that file/folder. And, if the user has the required access rights, the security software 121 will allow access to that file/folder. In another aspect, a group of users who share access to certain encrypted data can be pre-selected by the administrator of the security center 110. Furthermore, at step 530, the security software 121 may require user to perform pre-boot authorization, as described above, to access one or more HDDs 123 or encrypted parts thereof.

Figure 6:
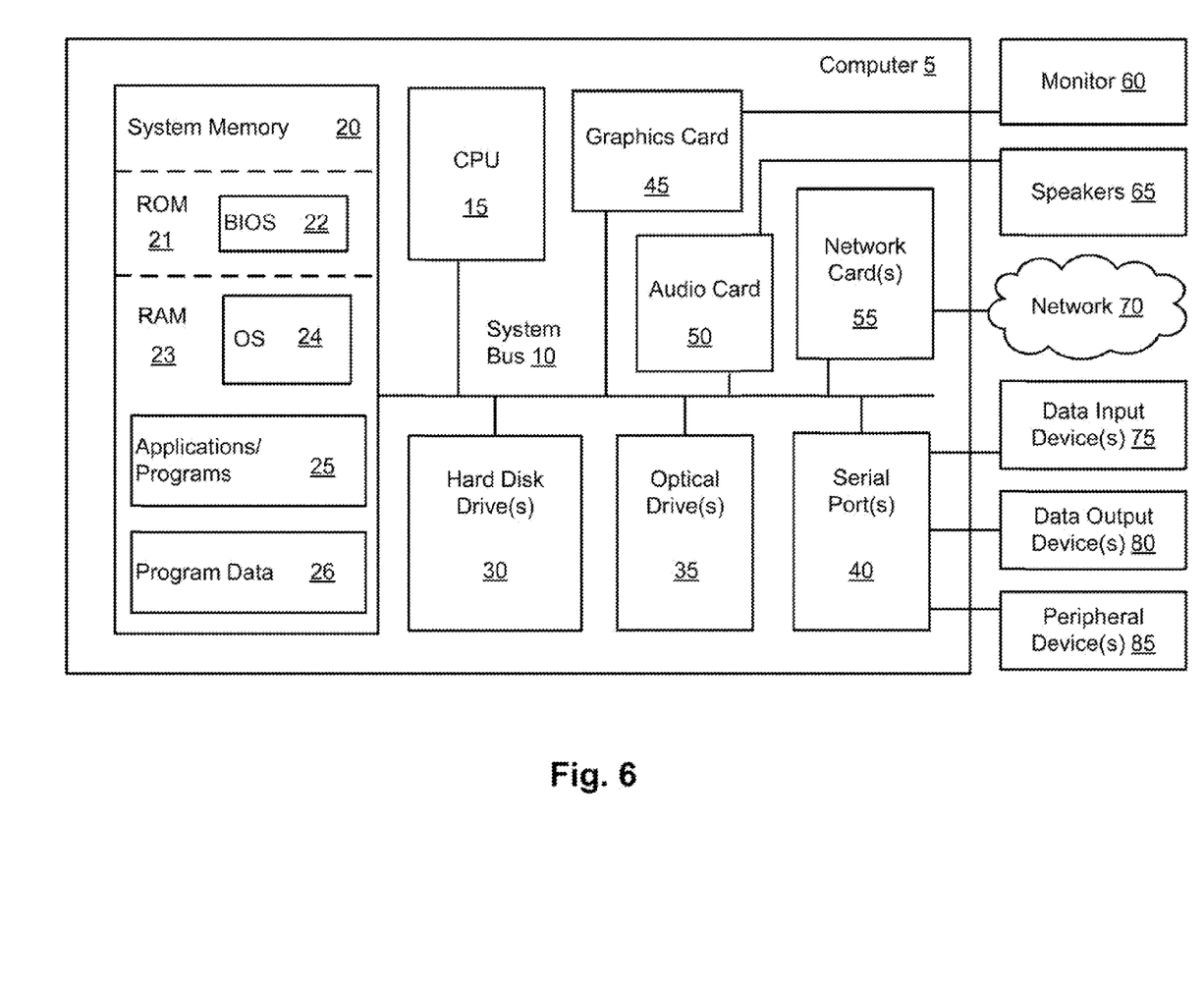
FIG. 6 illustrates a block diagram of a general-purpose computer suitable for implementing a system for accessing encrypted data in accordance with aspects of the present invention.

FIG. 6 depicts one example aspect of a computer system 5 that can be used to implement the disclosed systems and methods for providing access to encrypted data. The computer system 5 may include, but not limited to, a personal computer, a notebook, tablet computer, a smart phone, a network server, a router, or other type of processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a computer.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known components referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for providing user access to encrypted data on a user device comprising:
    receiving a security policy for the user device, wherein the security policy includes data access conditions: and data encryption conditions for one or more users of the user device;
    identifying one or more user accounts in the operating system (OS) of the user device for users specified in the data access conditions contained in the received security policy;
    automatically creating, by a hardware processor, at least one pre-boot authentication account (PBA) for the identified user accounts based on the data access conditions and based on an option in the security policy to automatically create the at least one PBA account with pre-boot authentication credentials including first access rights information governing access of one or more users to an encrypted portion of data stored on the user device and second access rights information governing access of the one or more users to the OS, wherein the at least one PBA account stores the pre-boot authentication credentials for authenticating the one or more users before booting of the OS on the user device, wherein the first access rights information and the second access rights information share at least one of a plurality of login credentials allowing a single sign-on of one or more users to an encrypted portion of data stored on the user device and to the OS of the user device; and
    encrypting at least a portion of data stored on the user device based on the data encryption conditions, wherein access to the encrypted portion of data is granted to the user at least upon entry of the correct pre-boot authentication credentials.

2. The method of claim 1, wherein encrypting at least a portion of data stored on the user device includes encrypting at least one of: one or more files or folders containing data of a user associated with each identified user account, all user data stored on the user device, all OS data stored on the user device, and one or more hard disk drives of the user device.

3. The method of claim 1, wherein receiving a security policy for the user device further includes receiving encryption and decryption keys for the user device.

4. The method of claim 3, wherein the encryption and decryption keys are stored on the user device in a container encrypted by the public key of a security server.

5. The method of claim 4 further comprising: sending the encrypted container to the security server for decryption of the container using public key of the security server; and receiving from the security server encryption and decryption keys decrypted by the server.

6. The method of claim 1, wherein the security policy includes one or more conditions for automatically creating PBA accounts for at least one of: all identified user accounts on the user device, all identified user accounts corresponding to the user accounts from a current domain or domains that have a trust relationship with the current domain, all local users, an integrated local administrator account, an owner of the user device, and a current active user.

7. The method of claim 1, wherein identifying one or more user accounts in the OS of the user device includes analyzing one or more of: registry branch HKEY_USERS, unloaded registry branches, directory of user accounts, and file "/etc/passwd".

8. The method of claim 1, wherein the plurality of login credentials include at least one of an OS login name, a PBA account name, an OS login password, and a PBA account password.

9. A system for providing user access to encrypted data on a user device, comprising:
    a hardware processor configured to:
    receive a security policy for the user device, wherein the security policy includes data access conditions: and data encryption conditions for one or more users of the user device;
    identify one or more user accounts in the operating system (OS) of the user device for users specified in the data access conditions contained in the received security policy;
    automatically create at least one pre-boot authentication account (PBA) for the identified user accounts based on the data access conditions and based on an option in the security policy to automatically create the at least one PBA account with pre-boot authentication credentials including first access rights information governing access of one or more users to an encrypted portion of data stored on the user device and second access rights information governing access of the one or more users to the OS, wherein the at least one PBA account stores the pre-boot authentication credentials for authenticating the one or more users before booting of the OS on the user device, wherein the first access rights information and the second access rights information share at least one of a plurality of login credentials allowing a single sign-on of one or more users to an encrypted portion of data stored on the user device and to the OS of the user device; and
    encrypt at least a portion of data stored on the user device based on the data encryption conditions, wherein access to the encrypted portion of data is granted to the user at least upon entry of the correct pre-boot authentication credentials.

10. The system of claim 9, wherein the processor further configure to encrypt at least one of: one or more files or folders containing data of a user associated with each identified user account, all user data stored on the user device, all OS data stored on the user device, and one or more hard disk drives of the user device.

11. The system of claim 9, wherein a security policy for the user device further contains encryption and decryption keys for the user device.

12. The system of claim 11, wherein the encryption and decryption keys are stored on the user device in a container encrypted by the public key of a security server.

13. The system of claim 12, wherein the processor further configured to send the encrypted container to the security server for decryption of the container using public key of the security server; and receive from the security server encryption and decryption keys decrypted by the server.

14. The system of claim 9, wherein the security policy includes one or more conditions for automatically creating PBA accounts for at least one of: all identified user accounts on the user device, all identified user accounts corresponding to the user accounts from a current domain or domains that have a trust relationship with the current domain, all local users, an integrated local administrator account, an owner of the user device, and a current active user.

15. The system of claim 9, wherein to identify one or more user accounts in the OS of the user device, the processor further configured to analyze one or more of: registry branch HKEY_USERS, unloaded registry branches, directory of user accounts, and file "/etc/passwd".

16. The system of claim 9, wherein the plurality of login credentials include at least one of an OS login name, a PBA account name, an OS login password, and a PBA account password.

17. A computer program product stored on a non-transitory computer-readable storage medium, the computer program product comprising computer-executable instructions for providing user access to encrypted data on a user device, including instructions for:
  receiving a security policy for the user device, wherein the security policy includes data access conditions: and data encryption conditions for one or more users of the user device;
  identifying one or more user accounts in the operating system (OS) of the user device for users specified in the data access conditions contained in the received security policy;
  automatically creating, by a hardware processor, at least one pre-boot authentication account (PBA) for the identified user accounts based on the data access conditions and based on an option in the security policy to automatically create the at least one PBA account with pre-boot authentication credentials including first access rights information governing access of one or more users to an encrypted portion of data stored on the user device and second access rights information governing access of the one or more users to the OS, wherein the at least one PBA account stores the pre-boot authentication credentials for authenticating the one or more users before booting of the OS on the user device, wherein the first access rights information and the second access rights information share at least one of a plurality of login credentials allowing a single sign-on of one or more users to an encrypted portion of data stored on the user device and to the OS of the user device; and
  encrypting at least a portion of data stored on the user device based on the data encryption conditions, wherein access to the encrypted portion of data is granted to the user at least upon entry of the correct pre-boot authentication credentials.

18. The product of claim 17, wherein instructions for encrypting at least a portion of data stored on the user device include instructions for encrypting at least one of: one or more files or folders containing data of a user associated with each identified user account, all user data stored on the user device, all OS data stored on the user device, and one or more hard disk drives of the user device.

19. The product of claim 17, wherein instructions for receiving a security policy for the user device further include instructions for receiving encryption and decryption keys for the user device, wherein the encryption and decryption keys are stored on the user device in a container encrypted by the public key of a security server.

20. The product of claim 19 further comprising instructions for:
  sending the encrypted container to the security server for decryption of the container using public key of the security server; and receiving from the security server encryption and decryption keys decrypted by the server.

21. The product of claim 20, wherein the security policy includes one or more conditions for automatically creating PBA accounts for at least one of: all identified user accounts on the user device, all identified user accounts corresponding to the user accounts from a current domain or domains that have a trust relationship with the current domain, all local users, an integrated local administrator account, an owner of the user device, and a current active user.

22. The product of claim 21, wherein instructions for identifying one or more user accounts in the OS of the user device include instructions for analyzing one or more of: registry branch HKEY_USERS, unloaded registry branches, directory of user accounts, and file "/etc/passwd".

23. The product of claim 17, wherein the plurality of login credentials include at least one of an OS login name, a PBA account name, an OS login password, and a PBA account password.

* * * * *